(12) United States Patent
Kulkarni et al.

(10) Patent No.: US 12,182,569 B2
(45) Date of Patent: Dec. 31, 2024

(54) GRAPHICS PROCESSOR UNIT WITH OPPORTUNISTIC INTER-PATH RECONVERGENCE

(71) Applicant: Purdue Research Foundation, West Lafayette, IN (US)

(72) Inventors: Milind Kulkarni, West Lafayette, IN (US); Jad Hbeika, Santa Clara, CA (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 18/217,062

(22) Filed: Jun. 30, 2023

(65) Prior Publication Data
US 2023/0350675 A1 Nov. 2, 2023

Related U.S. Application Data

(62) Division of application No. 17/491,057, filed on Sep. 30, 2021, now Pat. No. 11,726,785.

(60) Provisional application No. 63/085,852, filed on Sep. 30, 2020.

(51) Int. Cl.
G06F 9/30 (2018.01)
G06F 9/38 (2018.01)
G06T 1/20 (2006.01)

(52) U.S. Cl.
CPC ........ *G06F 9/30018* (2013.01); *G06F 9/3887* (2013.01); *G06T 1/20* (2013.01)

(58) Field of Classification Search
CPC .. G06F 9/30018; G06F 9/3887; G06F 9/3851; G06T 1/20
See application file for complete search history.

(56) References Cited

U.S. PATENT DOCUMENTS

| | | | | |
|---|---|---|---|---|
| 9,898,288 | B2* | 2/2018 | Lu | G06F 9/30054 |
| 10,262,386 | B2* | 4/2019 | Qian | G06T 1/20 |
| 10,360,039 | B2* | 7/2019 | Johnson | G06F 9/3013 |
| 10,776,110 | B2* | 9/2020 | Pearce | G06F 9/30036 |
| 11,093,250 | B2* | 8/2021 | Pearce | G06F 9/30123 |
| 11,126,439 | B2* | 9/2021 | Burns | G06F 9/30098 |

(Continued)

OTHER PUBLICATIONS

Dennard, Robert H. et al., Design of Ion-Implanted MOSFET's with Very Small Physica Dimensions. Proceedings of the IEEE, vol. 87, No. 4, Apr. 1999; reprinted from IEEE Journal of Solid-State Circuits, vol. SC-9, No. 5, pp. 256-268, Oct. 1974.

(Continued)

*Primary Examiner* — Corey S Faherty
(74) *Attorney, Agent, or Firm* — Purdue Research Foundation

(57) ABSTRACT

A graphics processing unit and methods for comping and executing instructions with opportunistic inter-path reconvergence are provided. An single instruction multiple thread (SIMT) stack of graphics processing unit may store data entries, each data entry comprising an operand mask. The operand mask may include bits corresponding to threads of a warp. The graphics processing unit core may access an instruction for an entry on the SIMT stack. Each of the threads may execute the instruction using either a first set of operands or a second set of operands depending on the corresponding bits of the operand mask.

5 Claims, 8 Drawing Sheets

(56) References Cited

U.S. PATENT DOCUMENTS

| | | | |
|---|---|---|---|
| 11,726,785 B2* | 8/2023 | Kulkarni | G06F 9/30018 712/224 |
| 2020/0081748 A1 | 3/2020 | Johnson et al. | |
| 2022/0206769 A1 | 6/2022 | Johnson et al. | |

OTHER PUBLICATIONS

Agarwal, Vikas et al., Clock Rate versus IPC: The End of the Road for Conventional Microarchitectures. In ISCA '00 Vancouver, British Columbia, Canada, Proceedings of the 27th Annual International Symposium on Computer Architecture, pp. 248-259, 2000.

Narasiman, Veynu et al., Improving GPU Performance via Large Warps and Two-Level Warp Scheduling. In Proc. of the ACM/IEEE International Symposium on Microarchitecture (MICRO '11), Dec. 3-7, 2011, pp. 308-317.

Rogers, Timothy G. et al., Cache-Conscious Wavefront Scheduling. In Proc. of the 2012 IEEE/ACM 45th Annual International Symposium on Microarchitecture (MICRO), 2012, pp. 72-.

Fung, Wilson W . . . et al., Dynamic Warp Formation and Scheduling for Efficient GPU Control Flow. In Proc. of the 40th EEE/ACM International Symposium on Microarchitecture (MICRO), 2007, pp. 407-420.

Fung, Wilson W.L. et al., Thread Block Compaction for Efficient SIMT Control Flow. In Proc. of the IEEE International Symposium on High-Performance Computer Architecture (HPCA), 2011, pp. 25-36.

Brunie, Nicolas et al., Simultaneous Branch and Warp Interweaving for Sustained GPU Performance. In Proc. of the ACM/IEEE International Symposium on Computer Architecture (ISCA), 2012, pp. 49-60.

Kapasi, Ujval J. et al., Efficient Conditional Operations for Data-Parallel Architectures. In Proc. of the ACM/IEEE International Symposium on Microarchitecture (MICRO), 2000, pp. 159-170.

Rhu, Minsoo et al., Maximizing SIMD Resource Utilization in GPGPUs with SIMD Lane Permutation. In Proc. of the ACM/IEEE International Symposium on Computer Architecture (ISCA), 2013, pp. 356-367.

Meng, Jiayuan et al., Dynamic Warp Subdivision for Integrated Branch and Memory Divergence Tolerance. In Proc. of the ACM/IEEE International Symposium on Computer Architecture (ISCA) '10), Jun. 19-23, 2010, pp. 235-246.

Rhu, Minsoo et al., The Dual-Path Execution Model for Efficient GPU Control Flow. In Proc. of the IEEE International Symposium on High-Performance Computer Architecture (HPCA), 2013, pp. 591-602.

Eltantawy, Ahmed et al., A Scalable Multi-Path Microarchitecture for Efficient GPU Control Flow. In Proc. of the IEEE International Symposium on High-Performance Computer Architecture (HPCA), 2014.

Krashinsky, Ronny et al., The Vector-Thread Architecture. In Proc. of the ACM/IEEE International Symposium on Computer Architecture (ISCA), Jun. 2004, pp. 84-90.

Keckler, Stephen W. et al., GPUs and the Future of Parallel Computing. IEEE Micro, Sep./Oct. 2011, pp. 7-17.

Rogers, Timothy G. et al., A Variable Warp Size Architecture. In Proc. of the ACM/IEEE International Symposium on Computer Architecture (ISCA '15), Jun. 13-17, 2015, pp. 489-501.

Che, Shuai et al., A Benchmark Suite for Heterogeneous Computing. In IEEE International Symposium on Workload Characterization (IISWC—2009), Oct. 2009, pp. 44-54.

Bakhoda, Ali et al., Analyzing CUDA Workloads Using a Detailed GPU Simulator. In IEEE International Symposium on Performance Analysis of Systems and Software (ISPASS—2009), Apr. 2009, pp. 163-174.

Wu, Bo et al., Enabling and Exploiting Flexible Task Assignment on GPU through SM-Centric Program Transformations. Proceedings of the 29th ACM on International Conference on Supercomputing, (ICS' 15), Jun. 8-11, 2015, pp. 119-130.

Le, Yunsup et al., Convergence and Scalarization for Data-Parallel Architectures. In Proc. of the ACM/IEEE International Symposium on Code Generation and Optimization (CGO '13), Feb. 23-27, 2013.

Mishkin, Michael et al., Write-after-Read Hazard Prevention in GPGPUsim. In Workshop on Deplicating, Deconstructing, and Debunking (WDDD), Jun. 2016.

Wong et al, Approximating Warps with Intra-warp Operand Value Similarity, IEEE, 2016 (Year: 2016).

Vaidya et al., SIMD Divergence Optimization through Intra-Warp Compaction, 2013 (Year: 2013).

* cited by examiner

GRAPHICS PROCESSOR UNIT WITH OPPORTUNISTIC INTER-PATH RECONVERGENCE

CROSS REFERENCE TO RELATED APPLICATIONS

This application is a divisional of U.S. application Ser. No. 17/491,057, filed Sep. 30, 2021, and claims the priority benefit of U.S. Provisional Application No. 63/085,852 filed Sep. 30, 2020, the entirety of which is incorporated herein by reference.

GOVERNMENT RIGHTS

This invention was made with government support under DE-SC0010295 awarded by the Department of Energy. The government has certain rights in the invention.

TECHNICAL FIELD

This disclosure relates to graphics processing and, in particular, to single instruction multiple thread technology.

BACKGROUND

The single instruction multiple thread (SIMT) execution model used in GPUs amortizes the energy and bandwidth cost per instruction over a set of threads executing in lockstep, known as a warp. Irregular control divergent applications degrade the efficiency of SIMT. When different threads in a warp decide to jump to different targets upon executing a branch instruction the lockstep execution is altered. Present architectures serialize the execution of threads following different paths within a given warp, which often leads to lower single instruction multiple data (SIMD) efficiency and needless serialization. Various approaches attempt to deal with control divergence. These approaches can be divided into three major categories.

The first approach is based on warp compaction. Warp compaction provides highly multithreaded throughput where a core has hundreds of threads running at the same time and executing the same kernel. Hence any target of a branch instruction is reached by many threads scattered among multiple warps. Hence it makes sense, to compact threads that follow the same control path into new warps upon a divergent branch.

The second family of approaches focuses improvements to the SIMT re-convergence stack. The observation behind these approaches is that divergent threads within a warp are independent and thus their execution can be interleaved. The interleaved execution makes use of the idle cycles. These techniques are helpful mainly because the number of warps that can co-exist is limited by the resources which makes it hard for the scheduler to hide long off-chip latency.

The third family of approaches adds a multiple instruction, multiple data (MIMD) capability to traditional GPUs: In other words, the GPU performs in a SIMD mode the convergent parts of a warp and upon divergence it switches to a MIMD mode which allows all threads to make progress and not be serialized.

While these techniques improve the performance of some applications with divergent control flow, they suffer from drawbacks like increased non-coalesced memory accesses, reduction in lock-stepping effect, and drawbacks, disadvantages, and inefficiencies.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Figure 1:
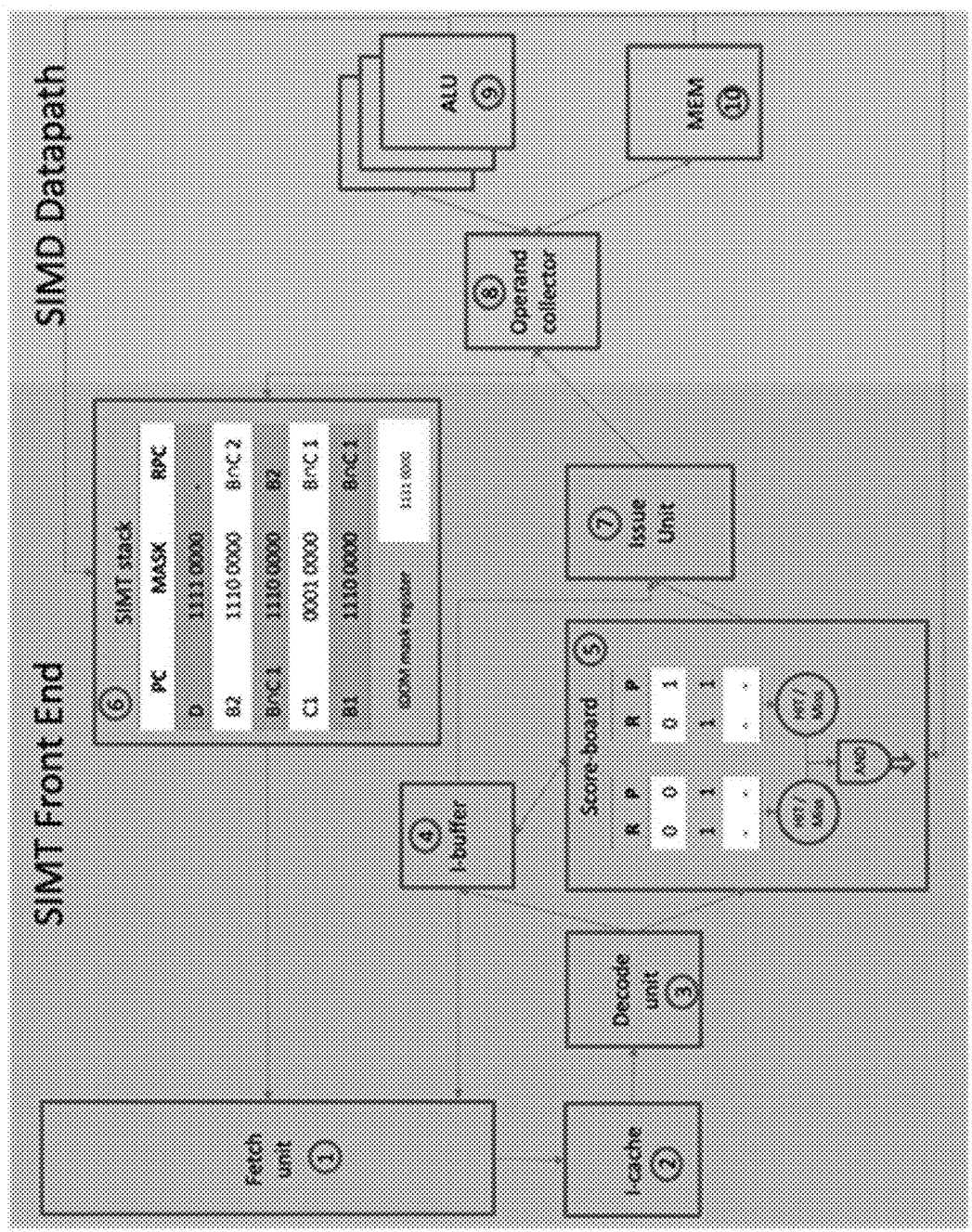
FIG. 1 illustrates a first example of a single instruction multiple thread (SIMT) Core 102 for a graphics processing unit (GPU).

GPUs are throughput-oriented machines. In other words, they get their improved performance, compared to superscalar out of order CPUs, from using heavy multithreading. In order to run thousands of threads, GPUs are made of many cores. For example, Turing TU102 GPU by NVIDIA has 72 cores. A core in a GPU is usually made up of 32 (or 64) lanes which allows running many (i.e. 32 or 64) threads in lockstep in any given cycle. By context switching between different warps a set of threads executing in lockstep each core in a GPU is capable of running thousands of threads. Threads executing on a given core can communicate results through a scratchpad memory. Moreover, different warps running on a given core can synchronize using fast barrier operations. In some examples, each core may have its own instruction cache and L1 data cache. Memory uses multiple channels in order to increase the data transfer rate.

GPUs may include multiple streaming multiprocessors (SM) each consisting of a set of cores. Hundreds or even thousands of threads run on each core and are divided into warps, where a warp is a set of threads that execute in lockstep. GPUs provide an abstract execution model known as single instruction multiple threads (SIMT) while executing on Single Instruction Multiple Data (SIMD) units. The lockstep execution of threads within a warp allows a single instruction fetch and decode as well as wide vector read/write access to register files. Similarly, memory accesses from different threads can be coalesced if accessing consecutive addresses. Hence, through SIMD execution GPUs can amortize the energy and bandwidth cost per instruction over a wide set of threads in a warp.

A core may have multiple warps at any given time waiting to be scheduled. Each cycle, a warp is selected for scheduling. Having multiple warps helps hide long execution latencies. In other words, when a warp is waiting for an access to off chip memory, the core will be running different warps. Unfortunately, the number of warps that can "live" concurrently on a core is limited by the resources. A warp must ensure that the core has enough resources and registers before it starts executing.

When executing a branch instruction, different threads within a warp may jump to different targets. This situation is known as control divergence. Upon control divergence, GPUs serialize the execution of diverging basic blocks in a control flow which causes TLP (Thread-level Parallelism) loss. Divergent threads re-converge at the immediate post dominator (IPDOM), which is the safest and earliest re-convergence point that can be identified at compile time.

Traditional GPGPUs' SIMT execution model is ineffective for workloads with irregular control-flow because of the serial execution of divergent paths. An insight of the system and methods described herein lies in the observation that divergent basic blocks executed serially share a lot of their opcodes. This is due to two facts:

a. First GPUs are RISC machines, thus two basic blocks will inevitably have 'many' common instructions, due to the limited number of instructions offered by the ISA. Note that even if these two blocks are performing completely different computation at a high level, their assembly version will have many common instructions, due to the large semantic gap between a high level language, CUDA in our case, and a RISC ISA b. Second, having one compiler applying the same set of optimizations and using the same code generation technique to generate both blocks, will result in many of the common instructions appearing in the same order. Thus two divergent basic blocks will most probably have 'many' common sub-blocks.

By serializing the execution of divergent blocks, the SIMT execution model is unjustifiably serializing the execution of these sub-blocks. In theory these sub-blocks can be executed in lockstep since they execute the same code on different lanes. Executing these common sub-blocks in lockstep will minimize the TLP loss caused by control divergence.

In order to execute these sub-blocks in lockstep a compiler may identify these blocks. Accordingly, a compiler analysis may identify common sub-blocks and annotate them.

Because this technique does not involve different warps to minimize the TLP loss, it is not expected to increase non coalesced memory accesses, an artifact that showed up in many previous works. Moreover, the suggested technique is also not expected to slowdown regular workloads since the compiler analysis will not identify any common sub-blocks in regular workloads; in other words, we end up executing the same old code.

The suggested system and methods described herein re-defines thread convergence from thread executing the same instructions to threads executing the same opcode. This new definition makes a given set of thread, less divergent. These 'less divergent' threads can still benefit from all previously suggested techniques for even less TLP loss. Hence this technique is complementary to all previously suggested solutions.

Various examples and embodiments of the system and methods described herein make use of a SIMT-stack to handle divergence and re-convergence in hardware or can use predication in software. Using an SIMT stack, every time the threads in a warp diverge two entries are pushed into the stack representing the two different control paths. An entry in the stack consists of three elements: the current program counter (PC), the active mask which helps tracking which threads are active at each path and a re-convergence PC (RPC). At any given time only one control path is executing which correspond to the entry at the top of the stack. Once the current PC equals the re-convergence PC an entry is popped from the stack and execution is moved to the next entry.

Various examples and embodiments of the system and methods described herein provide a fine-grained approach to exploit intra-warp convergence with opcode-convergent threads. Opcode convergent threads execute the same instruction, but with potentially different operands to support opportunistic convergence during execution of a control flow. The system and methods described herein provide compiler to prepare computer executable instructions for opcode convergent threading. In addition, the system and methods described herein provide a GPU architecture to execute opcode convergent threads.

FIG. 1 illustrates a first example of a single instruction multiple thread (SIMT) Core 102 for a graphics processing unit (GPU). The SIMT core 102 may include a fetch unit 1, and I-cache 2, a decode unit 3, and an I-buffer 4. The fetch unit 1 may include multiple program counters. The SIMT core 102 may interleave operation of multiple warps. A warp may be as associated with a program counter in the fetch unit 1. The program counter for a warp may point to the next instruction to be fetched for the warp.

The SIMT core 102 may further include an instruction-buffer (I-buffer) 4. The I-buffer 4 may include with at least two dedicated entries. An entry may include the instruction, a valid bit that indicates if an instruction is present, and a ready bit that indicates if the present instruction is ready for execution. In a cycle, the fetch unit 1 may fetch a new instruction from the i-cache 2 for a warp that has an empty slot in the I-buffer 4.

Figure 6:
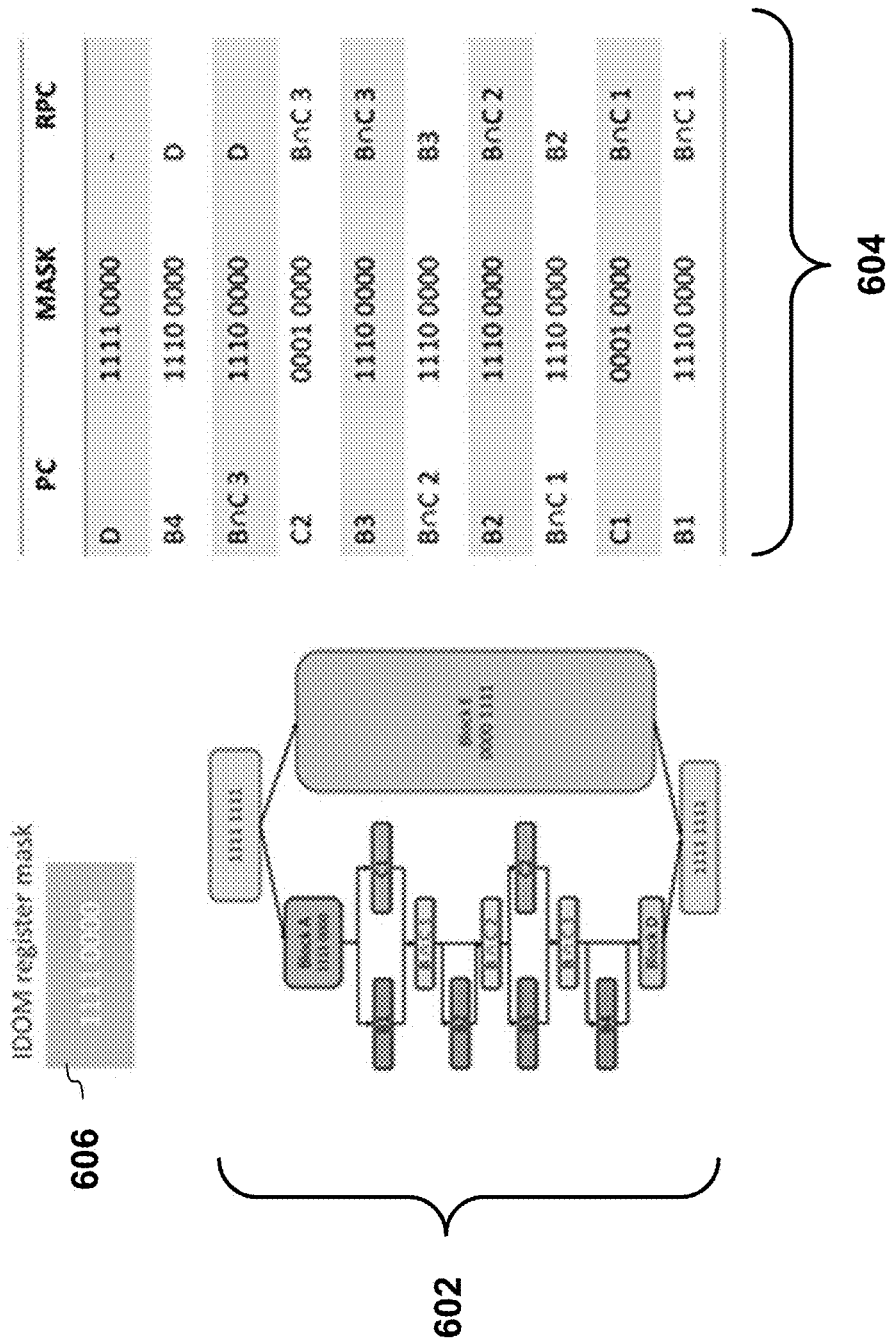
FIG. 6 illustrates an example of a control flow graph, a stack buffer, and a register mask.
Figure 7:
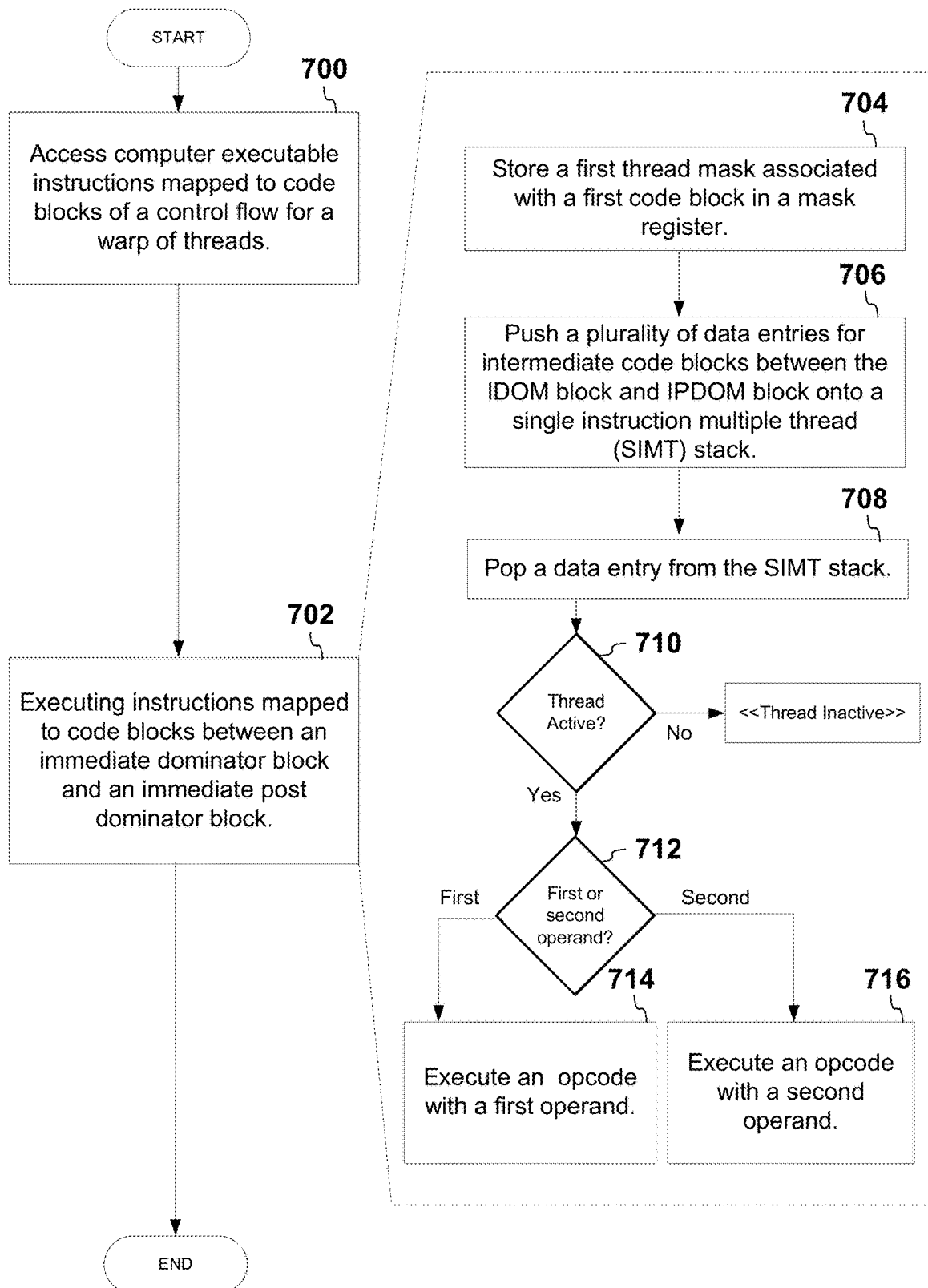
FIG. 7 illustrates a flowchart for example operations the SIMT core.

The SIMT core 102 may include an SIMT stack and IDOM mask register 6. The SIMT stack and IDOM mask register 6 may manage divergent code execution. The fetch unit 1 may fetch a new instruction from the i-cache 2 for a warp that has an empty slot in the i-buffer 4. The instruction is then decoded 3 and sent to the i-buffer with valid bit set to 1 and the ready bit unset. FIGS. 6-7 and the related discussion provide additional examples and discussion of the SIMT stack and IDOM mask register 6.

The instruction may remain until the ready bit is set to 1 by the scoreboard 5. The scoreboard 5 may track read after write (RAW) and write after write (WAW) data dependencies within each warp. The scoreboard may be updated in the following cases:

1) when an instruction is scheduled it is updated in order to show the destination register of the scheduled instruction as pending;
2) upon the completion of a write back the scoreboard entry for the corresponding register is cleared.

Before issuing an instruction, the scoreboard may be consulted to check for any RAW or WAW hazard. If no hazard exists, the instruction is considered for scheduling and the ready bit is set in the i-buffer.

The SIMT core 102 may follow an opcode_convergent_thread execution model. For example, instructions may access up to n registers where all n dependencies are checked before deciding whether a merged instruction is a valid candidate for scheduling or not. Moreover, dependencies are based on the original path that the register in question belongs to, otherwise the GPU could be missing multi-threading opportunities. Hence, the SIMT core may include 2 scoreboards to track the two paths independently. An instruction ready bit is set to 1 in the i-buffer if and only if both the left and the right scoreboards miss. Note in case of executing a convergent block the 2 scoreboards will be identical and in case of executing a divergent block the non-active path will miss definitely since we won't be checking its corresponding scoreboard.

Opcode-Convergent Threads and Complier Support

Traditional general purpose graphics processing units (GPGPUs) SIMT execution model is ineffective for workloads with irregular control-flow because of the serial execution of divergent paths. By serializing the execution of divergent blocks, the SIMT execution model is unjustifiably serializing the execution of these sub-blocks. In theory these sub-blocks can be executed in lockstep since they execute the same code on different lanes. Executing these common sub-blocks in lockstep will minimize the TLP loss caused by control divergence.

In order to execute these sub-blocks in lockstep we it is important to identify these blocks. A compiler analysis may identify these common sub-blocks and annotate them. These complier modifications may be utilized with hardware modifications (example provided in FIG. 1) so that these common blocks access their corresponding operands as well as some modifications to the SIMT re-convergence stack.

In the following section, a compiler identifies and annotate the common sub-blocks that lie within divergent basic blocks. In some examples, the compiler may be a source-to-source compiler that reads NVIDIA PTX assembly and generates a transformed and/or annotated PTX assembly, though other instruction set architectures are possible and contemplated.

Figures 2A, 2B, 3:
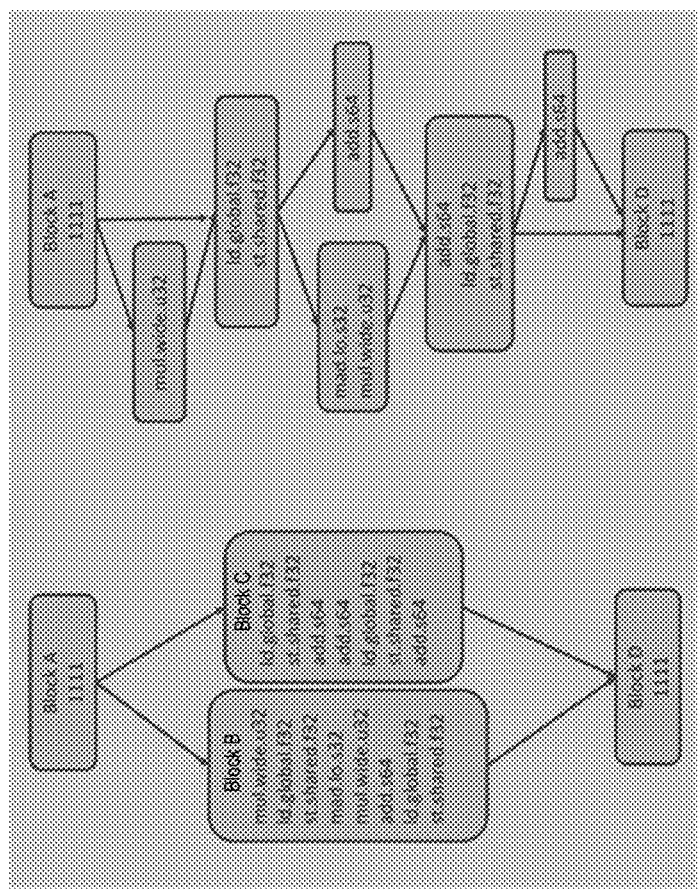
FIG. 2A-B illustrates examples of a control flow graph.
FIG. 3 illustrates an example of a least common subsequence table.

FIGS. 2A-B illustrates an examples of a control flow graph (CFG). The compiler may first build the CFG based on input code, as shown in FIG. 2A. A CFG is a representation using graph notation of all the paths that might be traversed by a thread. The compiler may identify the basic blocks that could potentially diverge at runtime. Two basic block may diverge at runtime and hence get executed serially, if they share the same immediate dominator (IDOM) and the same immediate post dominator (IPDOM).

Where the post dominator of a node X is defined to be any node Y in the program such that every path from node X to the end of the program must go through node Y. Y is an immediate post dominator of X if Y is the unique node that does not post dominate any other post dominator of X. Similarly, Y dominates X if Y is any node in the graph such that every path from the start of the program to node X must go through node Y. A node Y strictly dominates a node X if Y dominates X and Y does not equal X. Y is an immediate dominator of a node X if Y is the unique node that strictly dominates X but does not strictly dominate any other node that strictly dominates X. FIG. 2A shows that block B and block C share the same immediate dominator (IDOM) which is block A and share the same IPDOM which is block D. Hence threads could potentially diverge at the end of block A, which results in serial execution of block B and block C. Note that if we have divergence within block B and/or block C the execution of these divergent blocks will be serialized within the execution of Block B and/or block C.

The complier may identify the common opcodes between the divergent blocks. For that, the compiler may utilize the Longest Common Subsequence (LCS) algorithm. Where LCS is the problem of finding the longest subsequence common to all sequences in a set of sequences (two sequences in our case). FIG. 2B shows the resulting CFG after running LCS.

FIG. 3 illustrates the LCS table when the compiler works on finding the common instructions between blocks B and Block C in FIG. A. Note that the arrows shown in FIG. 3 are used by a trace-back procedure that deduce the common subsequences between the two streams by following the arrows backward, starting from the last cell in the table. Each diagonal arrow in the table represents a common instruction and the numbers represent the size of the longest common subsequence.

ISA Support

As mentioned earlier, opcode convergent blocks potentially need to access different operands based on their 'home basic block'. This issue can be solved through different techniques in software and/or in hardware. For example, the ISA may be extended so that each instruction in the initial ISA has an equivalent instruction that accesses double the number of operands. In this way, the compiler can re-write the code using these instructions as shown in Table 1 below. The common ADD instruction between the two divergent blocks is now replaced with an ADD that can read 4 operands and write to 2 different registers. Similarly, for the SUB instruction. We save the mask of the IDOM of divergent blocks in a special register that we call, the IDOM register mask register. This mask is used by each lane along with the SIMT stack mask to know whether it should access the first set of operands or the second set. Further discussion of the SIMT stack can be found in reference to FIGS. 6-7 below.

TABLE 1

| Tranformed instructions | |
|---|---|
| Original Code | Transformed Code |
| 1. add r1, r2, r3 | 1. add r1, r2, r3 |
| 2. @pi bra $LT10 | 2. @pi bra $LT10 |
| 3. mul r11, r12, r13 | 3. mul r11, r12, r13 |
| 4. add r4, r11, r2 | $LT10: |
| 5. sub r5, r6, r4 | 4. add r1, r2, r13 \| r4, r11, r2 |
| 6. bra $LT11 | 5. sub r14, r12, r1 \| r5, r6, r4 |
| $LT10: | 6. bra $LT11 |
| 7. add r1, r2, r13 | 7. cvt rd1 r2 |
| 8. sub r14, r12, r1 | $LT11: |
| 9. cvt rd1, r2 | 8. add r4, r11, r2 |
| $LT11: | 9. mov r5 |
| 10. add r4, r11, r2 | |
| 11. mov r5, 0 | |

Figure 4:
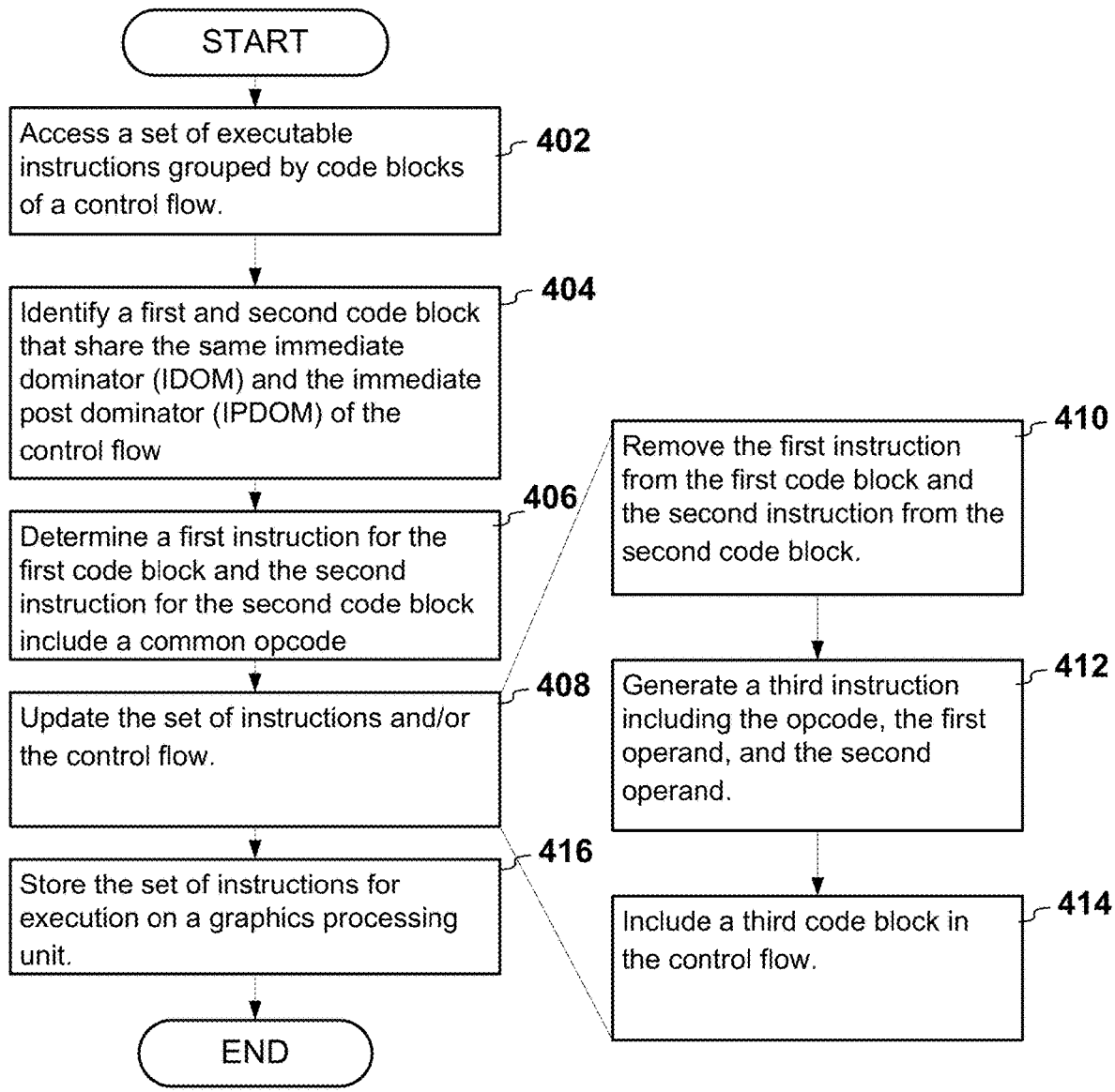
FIG. 4 illustrates a flow chart of example operations for compiling opcode convergent instructions.

FIG. 4 illustrates a flow chart of example operations for compiling opcode convergent instructions. The following discussion describes logic for preparing and compiling instructions that support opcode convergence. A compiler may access a set of executable instructions grouped by code blocks of a control flow 402. In some examples, the compiler may generate the control flow and/or annotate the code with labels corresponding to nodes of the control flow.

The compiler may identify a first and second code block that share the same immediate dominator (IDOM) and the immediate post dominator (IPDOM) of the control flow. (404). The compiler may determine a first instruction for the first code block and the second instruction for the second code block include a common opcode. (406). The first instruction may include the opcode and a first operand (or set of operands). The second instruction may include the opcode and a second operand (or set of operands).

The compiler may update the set of executable instructions for opcode inter-path convergence (408). The compiler may remove the first instruction from the first code block and the second instruction from the second code block (410). The compiler may generate a third instruction for a third code block in the control flow (412). The generated instruction may include the opcode, the first operand (or first set of operands), and the second operand (or second set of operands). The compiler may insert the new instruction into the original set of instructions or generate a new set of instructions with the new instruction. The new instruction may be annotated so for a control flow and the compiler may generate or update the control flow graph. The compiler may include a third code block with the third instruction in the control flow graph (414). In some examples, the third code block may reconverge from the first and the second code blocks in the control flow. The complier may store the updated set of instructions (416). In some examples, the compiler may generate a new set of instructions that include the updated set of instructions. Alternatively, the compiler may re-write and replace the original set of instructions.

Scoreboard

To increase multithreading opportunity current GPUs allows a warp to issue instructions back to back. Issuing instructions back to back from the same warp requires tracking RAW and WAW data dependencies within each warp. GPUs use scoreboards to check for data dependencies. Scoreboards are usually implemented as Content Addressable Memory (CAM) structures. The CAM structure is indexed using the warp ID and the register ID. Before issuing an instruction the scoreboard must be consulted to check for any RAW or WAW hazard. If no hazard exists, the instruction is considered for scheduling. Once scheduled, the scoreboard should be updated to show the destination register of the scheduled instruction as pending. Similarly, upon the completion of a write back the scoreboard entry for the corresponding register is cleared.

In the opcode_convergent_thread execution model described herein, instructions may access six registers, for example all dependencies should be checked before deciding whether an instruction is a valid candidate for scheduling or not. Moreover, the dependencies should be tracked based on the original path that the register in question belongs to, otherwise we could be missing multi-threading opportunities.

Figures 5A, 5B:
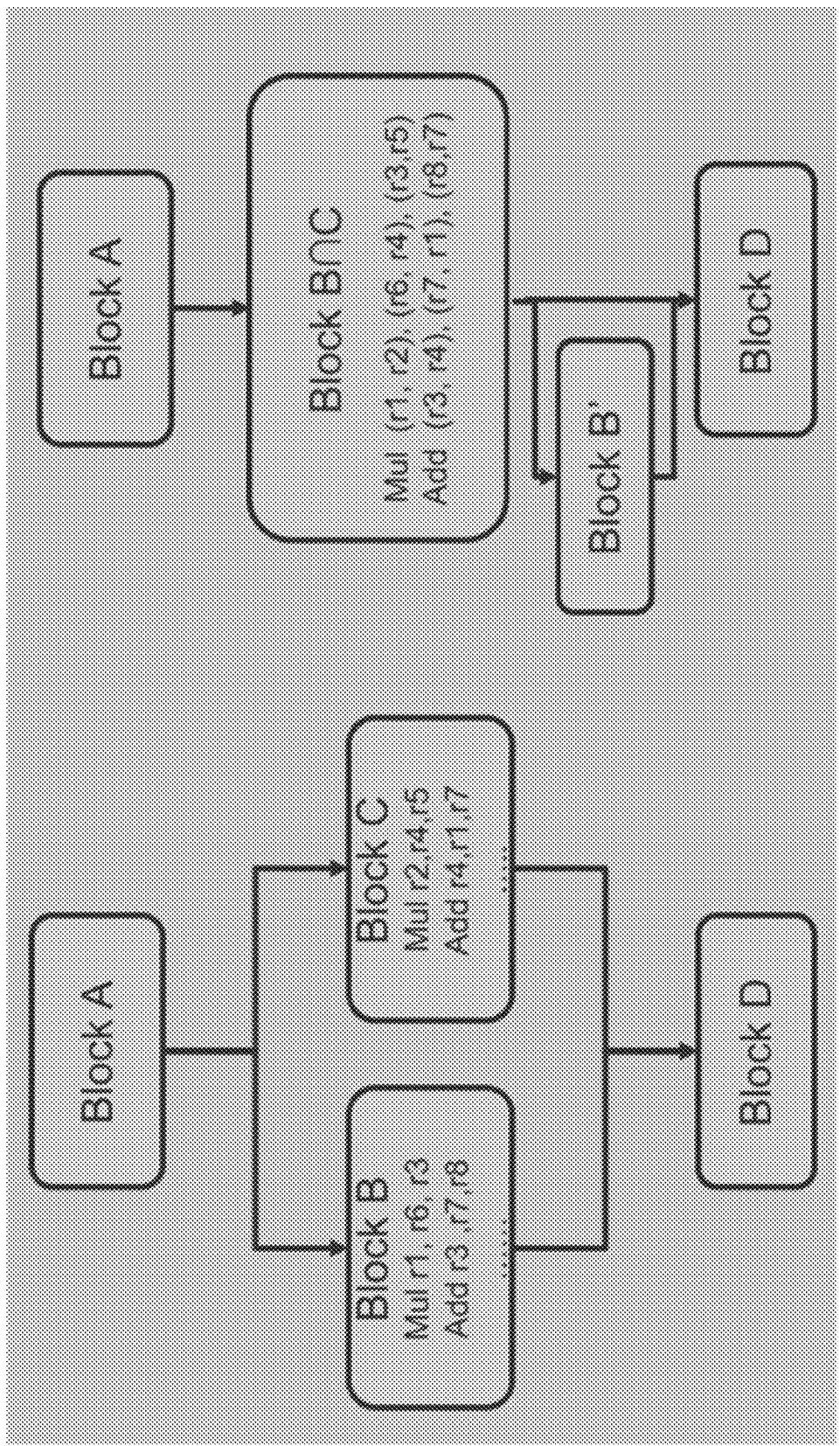
FIG. 5A-B illustrates an example of a transformed control flow graph (CFG).

FIG. 5A-B illustrates an example of a transformed CFG. Here, the transformed CFG includes a false data dependency to help make the last point clear. Register r1 and register r2 are written in the first instruction of the merged block (BNC). The following instruction is an ADD and it reads r1. However, looking at the original code (FIG. 5A) we notice that r1 is written in original block B while it is read in original block C, so there is no real dependency.

If we track dependency using one scoreboard there is no way to figure out this case and we may incorrectly stall block (BNC) (FIG. 5B) and lose multithreading, Hence the need for two different scoreboards. In the system and methods described herein we can identify three different types of basic blocks: the convergent basic blocks, the divergent basic blocks and the merged basic blocks. The scoreboard should be updated and checked differently based on the type of the basic block that the instruction in question belongs to. Following are the different scenarios for updating and checking the scoreboards and they are based on the type of the block that the instruction belongs to:

Instructions in a "Convergent block": When writing to a register the corresponding bit should be set in both scoreboards because dependent instructions in both sides of the CFG needs to see this register as pending if the current block diverges before the write back is complete. Similarly, when a write back is done, the pending bits should be updated in both scoreboards.

When scheduling an instruction from a convergent block it is enough to check one scoreboard since both scoreboards are identical at this point of execution Instructions in a "divergent block": When writing to a register only the scoreboard that belongs to the currently executing side of the branch should be updated, otherwise we may create a false dependency when the execution moves to the other side of the branch.

Similarly, we should only update one scoreboard upon the completion of a write-back. That being said, we should update both scoreboards upon re-convergence to a "convergent block" as follows. Instructions executing after re-convergence must see the pending writes from both divergent flows that re-converged, hence we must copy all the set bits in the first scoreboard to the second scoreboard and vice versa.

When scheduling an instruction from a divergent block we should check the scoreboard that corresponds to the side of the branch that we are currently executing Instructions in "merged block": Merged instructions access different registers based on the side of the branch they belong to in the original CFG. That being said, upon a write both scoreboards will be updated, however it is not the same update. Each scoreboard will set the register bit of the register that was written on the side of the branch that corresponds to this scoreboard. When a write-back is done only the corresponding scoreboard has its corresponding register bit reset. By updating register in this way we avoid false dependences. Once again, like in the case of divergent blocks, we have to unify both scoreboards upon re-convergence.

When scheduling an instruction from a "merged block" both scoreboards will be checked but each will check only the registers that its corresponding "divergent block" in the original CFG would have checked SIMT Stack FIG. 6 illustrates an example of a control flow graph (CFG) 602, an SIMT stack buffer 604, and an IDOM register mask 606.

The control flow graph 602 may include blocks (or nodes) that correspond to annotated groups of executable instructions organized by a complier. Blocks may diverge into two or more blocks when there is a conditional instruction, such as an "if/else" command. The immediate post dominator block is the earliest re-convergence node an immediate dominator block that can be guaranteed at compile time.

The control graph may be stored in a memory where the blocks of the control are mapped to executable instructions. In some examples, the complier may annotate the source code for a set of instructions and the boundaries of the code blocks may be defined by the annotations. The term "block" refers to the group of code corresponding to the node of a control graph.

When encountering a divergent branch, the SIMT stack will push the whole entries corresponding to the whole control flow between the branch and the immediate post dominator. For example, the SIMT stack buffer may include entries as illustrated in FIG. 2, including the program counter, opcode mask, and reconvergence program counter (RPC). At any given time only one control path is executing which correspond to the entry at the top of the stack. Once the current PC equals the re-convergence PC an entry is popped from the stack and execution is moved to the next entry.

Some of the code blocks pushed onto the SIMT stack buffer may reference merged instructions (also referred to as opcode convergent instructions). A merged instruction may have multiple sets of operands. For example, the merged instruction may be generated by way a compiler that supports opcode convergent threading, as described in reference to FIG. 3. A thread executing a merged instructions should be told which set of operands to use. Thus, the mask of the IDOM of the diverging branch may be inserted into a IDOM register. The opcode mask in the SIMT stack may select the operand set for each lane. If the lane has a zero bit in the "IDOM register" mask, then this lane should not be executing. Otherwise, a 1 means that this lane should be active. A zero in the SIMT stack mask refers to accessing operand set number one. A one in the SIMT stack refers to accessing operand set number two.

In the example illustrated in FIG. 6, there are eight threads per warp. Only the first 4 lanes execute block A upon the first divergence. When block A starts executing and we diverge again at the end of block A and we push the whole entry in the stack. The Mask of block A is saved in the IDOM mask register 606.

When the merged instructions of block B∩C 1 starts executing the mask is 1110 0000. Since the first four bits of the IDOM mask register are 1, the first four bits of the masks stored in the stack indicate which set of operands to access while the second four bits indicate the idle status. Thus, for example, the zero of lane 4 does not mean must be idle. Instead, the zero of lane 4 means that that lane four must execute the merged block while accessing the first set of operands while lanes 5 through 8 should be idle and lanes 1 through 3 should execute the merged block accessing the second set of operands. In order to decide that the 0 in the mask corresponding to lane 4 should be treated differently than the zeros of lane 5 through 8 the SIMT core compares the mask to the IDOM mask register.

Note that, if the SIMT stack 604 gets too big because of pushing the whole control flow that lies between the IDOM and the IPDOM of a divergent branch the compiler can decide to insert explicit branch instructions. Each explicitly inserted branch if inserted at the middle of the entry can divide the number of needed entries by 2.

FIG. 7 illustrates a flowchart for example operations the SIMT core 102. The SIMT core 102 may access computer executable instructions mapped to code blocks of a control flow (700). For example, the code blocks may be associated/mapped with executable instructions. The mappings may be generated by, for example, annotations created during compilation of the instructions.

In some examples, the code blocks include an immediate dominator (IDOM) of the control flow and an immediate post dominator (IPDOM) of the control flow. The SIMT core may execute instructions mapped to code blocks between the immediate dominator block and the immediate post dominator block (702). Operations 704-716 describe the execution used to achieve opcode convergent threading.

The SIMT core may store a first thread mask associated with a first code block in a mask register (704). When stored in the mask register, the first thread mask may include a plurality of bits indicative of the active or non-active status for the threads of the warp, respectively.

The SIMT core may push a plurality of data entries onto the SIMT stack buffer (706). The data entries may correspond the code blocks between the first code block and the second code block. Each of the data entries may include a thread mask for the code block.

To execute an instruction in an intermediate block between the IDOM and IPDOM, the SIMT core may pop a data entry from the SIMT stack (708). The data entry may correspond to an intermediate code block between the immediate dominator block and immediate post dominator block. The intermediate code block may include a second thread mask. The second thread mask may indicate which set of operands a particular thread of the warp should use.

The SIMT core may determine, based on the thread mask in the IDOM register, whether a thread in the warp should execute or not (710).

In response to the thread mask indicating an active status for a thread (710, yes), the SIMT core may execute instructions of the intermediate code block with the thread (712-416).

The SIMT core may determine whether to use a first set of operands or second set of operations (712). For example, the SIMT core may execute the instruction with the first set of operates (714) or the second set of operations (716) depending on the second thread mask of the intermediate code block.

Nested Divergence

Figure 8C:
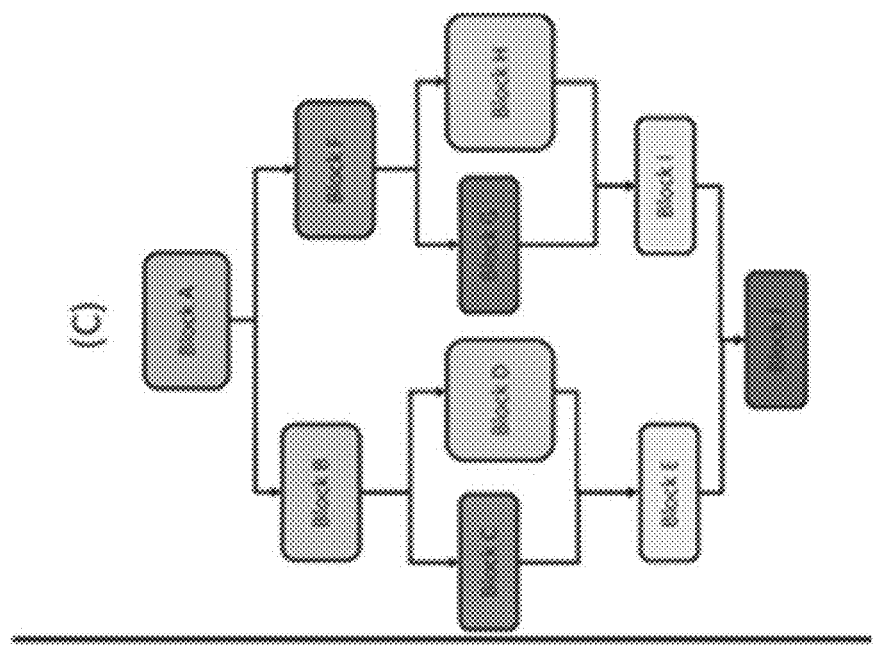
FIG. 8A-C illustrates examples of various control flow paths accounting for nested divergence.
Figure 8B:
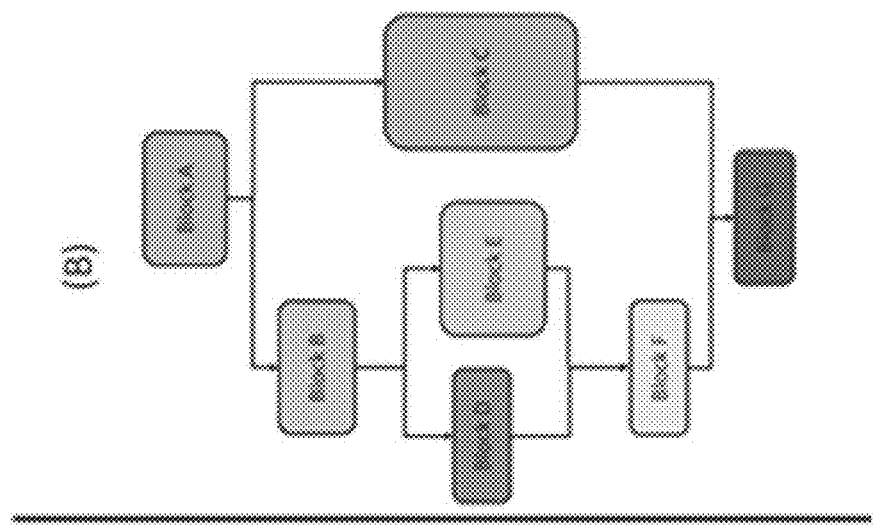
Figure 8A:
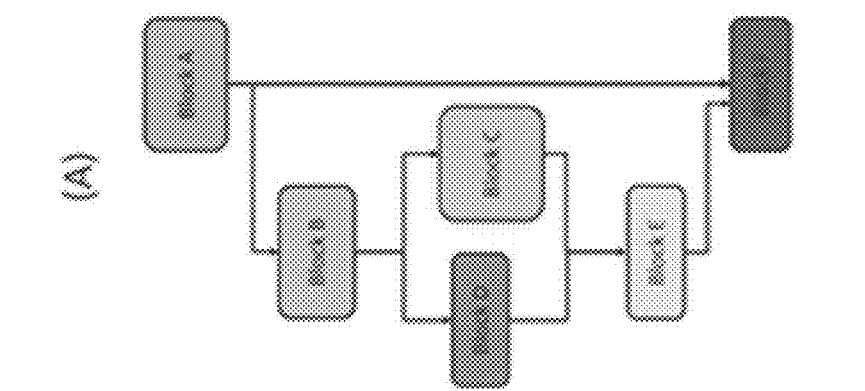

FIG. 8A-C illustrates examples of various control flow paths accounting for nested divergence.

It could happen that divergent paths are nested within other divergent paths as shown in the FIG. 8A. Merging instructions from two divergent paths may involve extending each instruction in the ISA with an extra operand set in order to accommodate two paths. Similarly, if instructions are merged from more paths, in case of nested divergence, the ISA may be further extended to accommodate the newly merged paths. For example, if we merge instructions from blocks D, E, and C in FIG. 8B these merged instructions must offer three operand sets to accommodate the three merged paths.

After examining the various experimental, it was found out that the occurrence of nested 2-way branch structures within 2-way branch structures is rare thus, merging instructions from more than two paths may complicate the ISA and eventually the microarchitecture without offering major benefits in term of performance. Thus, it may be desirable not to merge instructions from more than two paths. However, nested divergence and the compiler may choose which paths to merge. Consider FIG. 8B, since we are using one IDOM-mask register, the compiler must either merge block D with block E and in this case the IDOM-mask register would save the mask of block B, or the compiler must merge blocks B and F with block C and in this case the IDOM-mask register would save the mask of block A. The compiler simply decides between these two options based on the number of instructions that could be potentially saved by each merging scenario.

Note that in case the number of potentially saved instructions is equal the compiler prioritize merging at the outer level (i.e. blocks B and F with block C) because there is a higher probability that threads diverge at the outer level since the number of threads at the outer divergent branch is greater than or equal to the number of threads at the inner divergent branch.

Note that in case we want to merge both the outer and the inner divergent blocks we can either save two IDOM masks, namely the mask of block A and the mask of Block B or we can simply add an extra mask to the SIMT re-convergence stack that helps each lane figure out which operand set it must access.

Regarding FIG. 8C the compiler compares the number of saved instructions if blocks C and D are merged together and blocks G and H are merged together with the number of instructions saved if blocks B and E are merged with blocks F and I. Similarly to FIG. 43-B, the compiler prioritize merging the outer divergent blocks over the inner divergent blocks in case of a tie.

The logic illustrated in the flow diagrams of FIG. 3 and FIG. 4 may include additional, different, or fewer operations than illustrated. The operations illustrated may be performed in an order different than illustrated.

The compiler may be implemented with additional, different, or fewer components than illustrated. Alternatively or in addition, a system may include the compiler.

Figure 9:
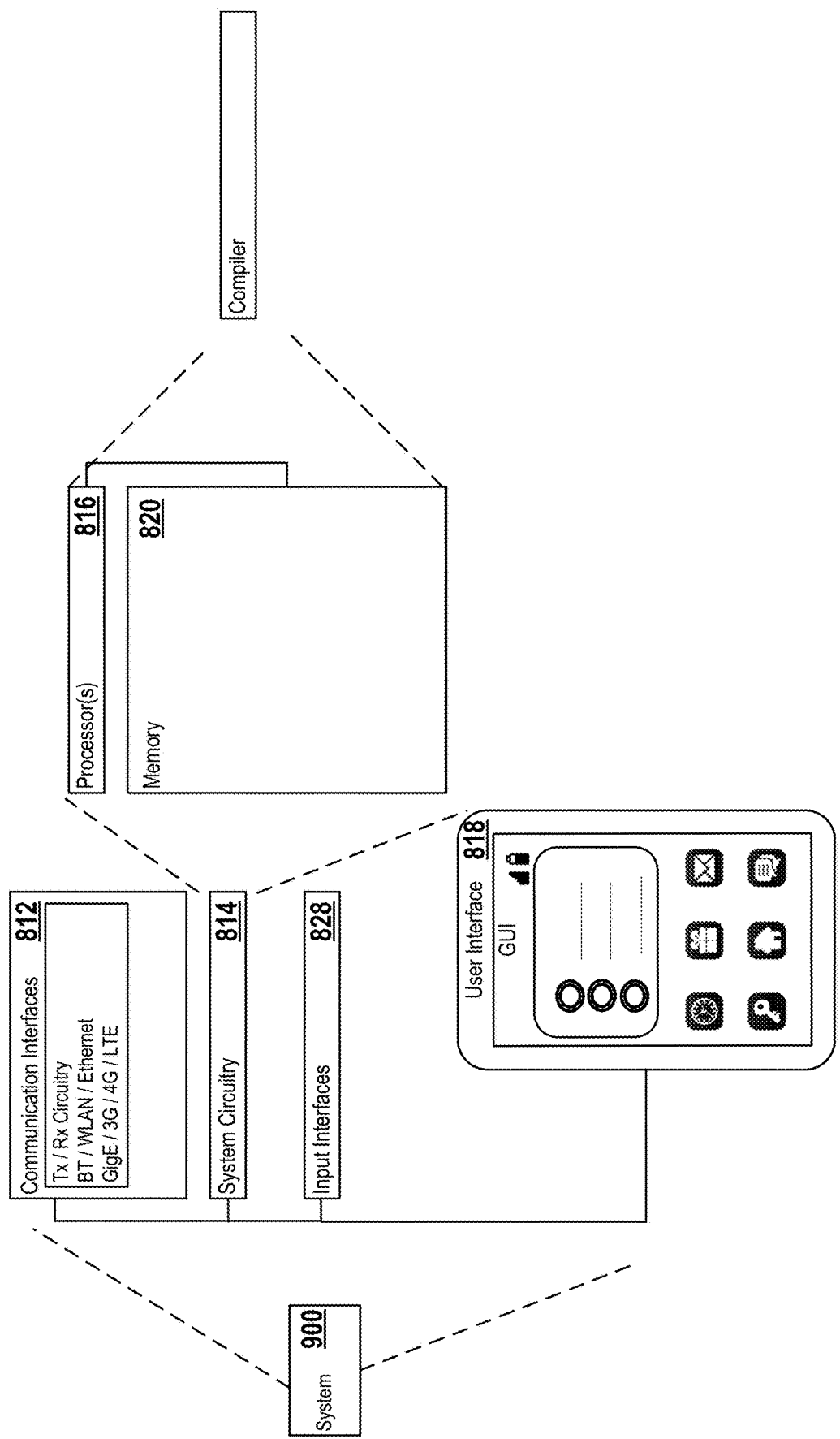
FIG. 9 illustrates an example of a system.

FIG. 9 illustrates an example of a system 900. The system 900 may include communication interfaces 812, input interfaces 828 and/or system circuitry 814. The system circuitry 814 may include a processor 816 or multiple processors. Alternatively or in addition, the system circuitry 814 may include memory 820.

The processor 816 may be in communication with the memory 820. In some examples, the processor 816 may also be in communication with additional elements, such as the communication interfaces 812, the input interfaces 828, and/or the user interface 818. Examples of the processor 816 may include a general processor, a central processing unit, logical CPUs/arrays, a microcontroller, a server, an application specific integrated circuit (ASIC), a digital signal processor, a field programmable gate array (FPGA), and/or a digital circuit, analog circuit, or some combination thereof.

The processor 816 may be one or more devices operable to execute logic. The logic may include computer executable instructions or computer code stored in the memory 820 or in other memory that when executed by the processor 816, cause the processor 816 to perform the operations the compiler, and/or the system 900. The computer code may include instructions executable with the processor 816.

The memory 820 may be any device for storing and retrieving data or any combination thereof. The memory 820 may include non-volatile and/or volatile memory, such as a random access memory (RAM), a read-only memory (ROM), an erasable programmable read-only memory (EPROM), or flash memory. Alternatively or in addition, the memory 820 may include an optical, magnetic (hard-drive), solid-state drive or any other form of data storage device. The memory 820 may include at least one of the compiler, and/or the system 900. Alternatively or in addition, the memory may include any other component or sub-component of the system 900 described herein.

The user interface 818 may include any interface for displaying graphical information. The system circuitry 814 and/or the communications interface(s) 812 may communicate signals or commands to the user interface 818 that cause the user interface to display graphical information. Alternatively or in addition, the user interface 818 may be remote to the system 900 and the system circuitry 814 and/or communication interface(s) may communicate instructions, such as HTML, to the user interface to cause the user interface to display, compile, and/or render information content. In some examples, the content displayed by the user interface 818 may be interactive or responsive to user input. For example, the user interface 818 may communicate signals, messages, and/or information back to the communications interface 812 or system circuitry 814.

The system 900 may be implemented in many different ways. In some examples, the system 900 may be implemented with one or more logical components. For example, the logical components of the system 900 may be hardware or a combination of hardware and software. The logical components may include the compiler, or any component or subcomponent of the system 900. In some examples, each logic component may include an application specific integrated circuit (ASIC), a Field Programmable Gate Array (FPGA), a digital logic circuit, an analog circuit, a combination of discrete circuits, gates, or any other type of hardware or combination thereof. Alternatively or in addition, each component may include memory hardware, such as a portion of the memory 820, for example, that comprises instructions executable with the processor 816 or other processor to implement one or more of the features of the logical components. When any one of the logical components includes the portion of the memory that comprises instructions executable with the processor 816, the component may or may not include the processor 816. In some examples, each logical component may just be the portion of the memory 820 or other physical memory that comprises instructions executable with the processor 816, or other processor(s), to implement the features of the corresponding component without the component including any other hardware. Because each component includes at least some hardware even when the included hardware comprises software, each component may be interchangeably referred to as a hardware component.

Some features are shown stored in a computer readable storage medium (for example, as logic implemented as computer executable instructions or as data structures in memory). All or part of the system and its logic and data structures may be stored on, distributed across, or read from one or more types of computer readable storage media. Examples of the computer readable storage medium may include a hard disk, a floppy disk, a CD-ROM, a flash drive, a cache, volatile memory, non-volatile memory, RAM, flash memory, or any other type of computer readable storage medium or storage media. The computer readable storage medium may include any type of non-transitory computer readable medium, such as a CD-ROM, a volatile memory, a non-volatile memory, ROM, RAM, or any other suitable storage device.

The processing capability of the system may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (for example, a dynamic link library (DLL).

All of the discussion, regardless of the particular implementation described, is illustrative in nature, rather than limiting. For example, although selected aspects, features, or components of the implementations are depicted as being stored in memory(s), all or part of the system or systems may be stored on, distributed across, or read from other computer readable storage media, for example, secondary storage devices such as hard disks, flash memory drives, floppy disks, and CD-ROMs. Moreover, the various logical units, circuitry and screen display functionality is but one example of such functionality and any other configurations encompassing similar functionality are possible.

The respective logic, software or instructions for implementing the processes, methods and/or techniques discussed above may be provided on computer readable storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one example, the instructions are stored on a removable media device for reading by local or remote systems. In other examples, the logic or instructions are stored in a remote location for transfer through a computer network or over telephone lines. In yet other examples, the logic or instructions are stored within a given computer, central processing unit ("CPU") and/or graphics processing unit ("GPU").

Furthermore, although specific components are described above, methods, systems, and articles of manufacture described herein may include additional, fewer, or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same apparatus executing a same program or different programs. The components may be resident on separate hardware, such as separate removable circuit boards, or share common hardware, such as a same memory and processor for implementing instructions from the memory. Programs may be parts of a single program, separate programs, or distributed across several memories and processors.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

What is claimed is:

1. A single instruction multiple thread (SIMT) core comprising:
   a SIMT stack configured to store data entries, each data entry comprising an operand mask, the operand mask comprising bits corresponding to threads of a warp, respectively,
   wherein the graphics processing unit core is configured to:
   access an instruction for an entry on the SIMT stack;
   execute the instruction with at least one of the threads of a warp,
   wherein each of the at least one of the threads execute the instruction using either a first set of operands or a second set of operands depending on the corresponding bits of the operand mask.

2. The SIMT core of claim 1 further comprising:
   an immediate dominator (IDOM) mask register comprising bits corresponding to the threads of the warp, respectively, the bits indicative of a thread active state or a thread inactive state.

3. The SIMT core of claim 2, wherein the instruction is executed only with the threads indicated as active by the bits of the IDOM mask register.

4. The SIMT core of the claim 1, wherein the entry of the SIMT stack further comprises a block program counter indicative of the memory location of the instruction for the data entry, wherein the instruction is accessed based on the block program counter.

5. The SIMT core of claim 4, the entry of the SIMT stack further comprising a reconvergence program counter, wherein the graphics processor core if further configured to:
   pop the entry from the stack in response to a program counter of the SIMT core being equal or greater than the reconvergence program counter.

* * * * *